United States Patent

Lygren

[11] Patent Number: 5,814,229
[45] Date of Patent: Sep. 29, 1998

[54] WATER TREATMENT METHOD AND APPARATUS

[75] Inventor: Elvind Lygren, Oslo, Norway

[73] Assignee: Puraq AS, Oslo, Norway

[21] Appl. No.: 687,525

[22] PCT Filed: Feb. 6, 1995

[86] PCT No.: PCT/NO95/00027

§ 371 Date: Sep. 26, 1996

§ 102(e) Date: Sep. 26, 1996

[87] PCT Pub. No.: WO95/21134

PCT Pub. Date: Aug. 10, 1995

[30] Foreign Application Priority Data

Feb. 7, 1994 [NO] Norway ................................. 940390

[51] Int. Cl.$^6$ ........................................................ C02F 1/24
[52] U.S. Cl. .......................... 210/703; 210/712; 210/194; 210/221.2; 210/512.1
[58] Field of Search .................................. 210/703, 712, 210/788, 789, 194, 221.1, 221.2, 512.3, 512.1, 926

[56] References Cited

U.S. PATENT DOCUMENTS

| 2,418,950 | 4/1947 | Montgomery . |
| 3,428,175 | 2/1969 | Hukki . |
| 4,663,046 | 5/1987 | Feldkirchner . |
| 4,696,740 | 9/1987 | Mochizuki . |
| 4,721,562 | 1/1988 | Barnscheidt . |
| 4,834,872 | 5/1989 | Overath . |
| 5,108,586 | 4/1992 | Iwashige . |
| 5,139,662 | 8/1992 | Ozawa . |
| 5,160,620 | 11/1992 | Lygren . |
| 5,509,535 | 4/1996 | Schneider . |

FOREIGN PATENT DOCUMENTS

| 3126832 | 1/1983 | Germany . |
| 58996 | 6/1938 | Norway . |
| 830531 | 3/1960 | United Kingdom . |
| 1442547 | 7/1976 | United Kingdom . |

Primary Examiner—Thomas M. Lithgow
Attorney, Agent, or Firm—Wenderoth, Lind & Ponack, L.L.P.

[57] ABSTRACT

Water to be treated is introduced into a basin having a closed bottom and an outer wall. A stationary diffuser is located at the bottom at a position spaced from the outer wall and produces air bubbles of varying size acting to lift water impurities toward the surface of the water and to circulate the water in the basin as a first stream flowing vertically upwardly from the diffuser, horizontally outwardly toward the outer wall, vertically downwardly toward the bottom and horizontally along the bottom back to the diffuser. A second stream is caused to circulate circumferentially in the basin. The first and second circulating streams cooperate to cause foam and slurry formed on the surface to concentrate in an outer peripheral flow path from which the foam and slurry are removed.

8 Claims, 4 Drawing Sheets

WATER TREATMENT METHOD AND APPARATUS

BACKGROUND OF THE INVENTION

The invention relates to a method and apparatus for treating water. More specifically, the invention is a further development of the method and apparatus described in EP patent publication No. 0 448 597.

As explained in the latter publication the water treatment takes place mainly by flotation and physical adsorption based on air bubbles of varying sizes produced from a diffusor at the bottom of a water basin. Thus, the flotation process is carried out by means of air bubbles of a size ranging from about 0.03 mm up to about 0.12 mm attaching to particles thus increasing their buoyancy. The particles as a consequence from a slurry at the surface. The adsorption process occurs via air bubbles of a size about 0.8 mm combining with colloidal or dissolved polarized substances and forming therewith a voluminous bubble foam at the water surface.

According to the above patent the diffusor is located in a chamber which is partly separated from the remaining part of the basin by a partition wall and has a substantially smaller volume than that of the latter part. The adsorption process then takes place substantially within this chamber while the flotation process takes place substantially within the basin itself, and the water, owing to the pumping effect from the diffusor bubbles, circulates up through the chamber and out into the basin at the opposite side of the partition wall. The bubble foam is continuously removed as it forms at the water surface in the chamber, while the slurry that is formed way out in the basin is removed at the rim of the basin opposite the chamber. At either place the removal is carried out by allowing the foam and slurry respectively to flow over a weir together with a top water layer.

While the technique according to the above EP patent represents a substantial improvement compared to prior water treatment methods, it also suffers from certain defects and disadvantages. Thus, it is a problem to get the bubble foam at the chamber water surface removed sufficiently rapidly by the weir technique that is used. As noted in the patent it is important to have this foam removed before it disintegrates to drop the impurities back into the water. Another disadvantage is the fact that by the above weir technique a relatively large water flow will accompany the foam and slurry out of the basin.

SUMMARY OF INVENTION

According to the present invention it has now been found that these defects and disadvantages of the process disclosed in the EP patent can be avoided in a particularly simple manner.

Thus, surprisingly it has been found that if the wall that partly separates the chamber from the remaining part of the prior basin is removed, then important advantages may be achieved if, in addition to the laterally directed water circulation that takes place in the basin owing to the diffusor pumping effect, also a longitudinally circulating flow is established in the basin water. Practically all of the foam and slurry on the water surface will then gradually gather in a peripheral flow path in the basin and may easily be removed from one or more places therealong. The foam is viscous and the slurry will intermix with the foam and attach to it thus forming a stabile foam-slurry mixture. According to a preferred embodiment of the invention the foam-slurry mixture is effectively removed from the flow path by means of a suction means communicating with a vacuum source.

The fact that the system according to the invention, contrary to that described in the above EP patent No. 0 448 597, does not include any chamber-forming partition wall in the water basin results in a reduced residence time of the foam before it is removed. Furthermore the foam is quickly removed from the turbulent zone above the air diffusers where the foam tends to disintegrate. This results in a lower resuspension of impurities, leading to an enhanced cleaning effect. Additionally, removal of the chamber partition wall allows the foam from the adsorption process, together with the floating slurry from the flotation process interacting with the foam to form a stabile mixture, to be diverted by the flow to a central region in which it can be effectively removed by means of a vacuum technique. Furthermore, the vacuum technique will disintegrate the foam and further mix it with the slurry to form a homogenous sludge which allows the suspended matter to be separated from the water phase in an effective manner, i.e. by simple sedimentation, such that the water content of the sludge may be reduced by about two orders. This results in a large cost reduction in sludge treatment, which in the earlier patent represented a considerable part of the total costs of the treatment plant.

BRIEF DESCRIPTION OF THE DRAWINGS

The invention will be described more fully below with reference to the drawings in which.

DETAIL DESCRIPTION OF THE INVENTION

Figure 1:
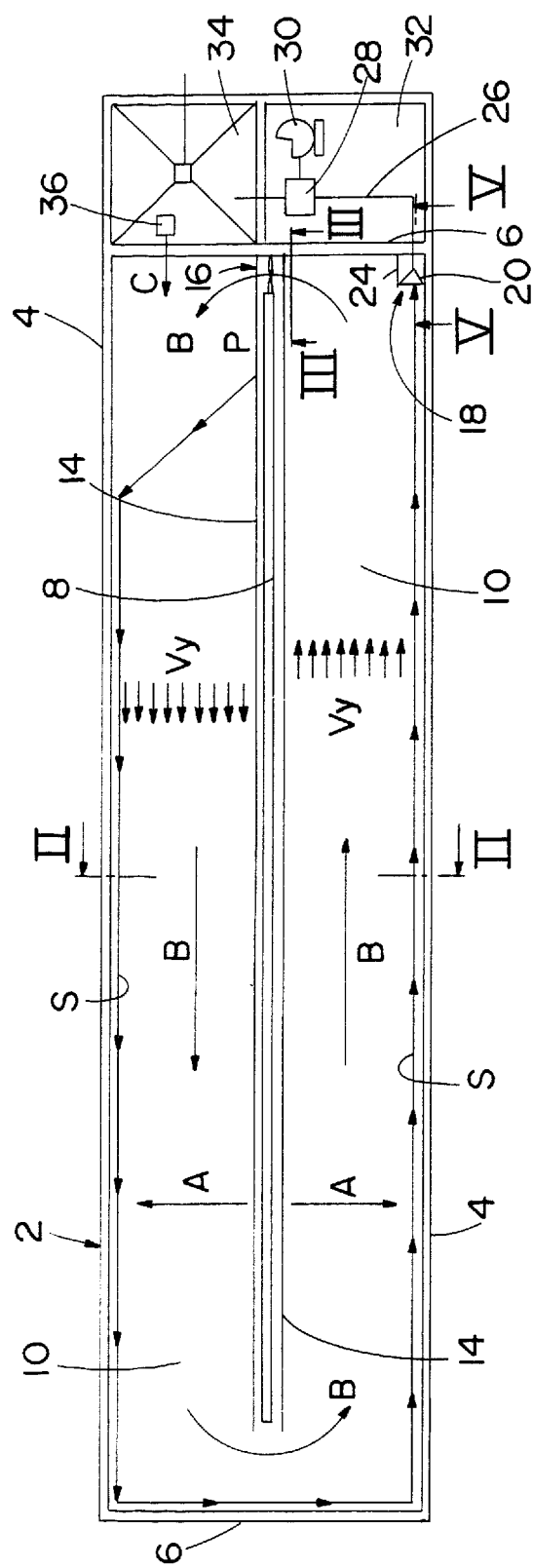
FIG. 1 is a plan view of a plant based on the method and device according to the invention.

The plant shown in the drawing is primarily, but not exclusively, built for fish fattening. It comprises a water basin 2 which, in the example shown in FIG. 1, has a longitudinal rectangular peripheral wall including side walls 4 and end walls 6. The basin may have a base surface of about 10 m×50 m, for example, and built for a normal water depth of about 3 m.

Figure 3:
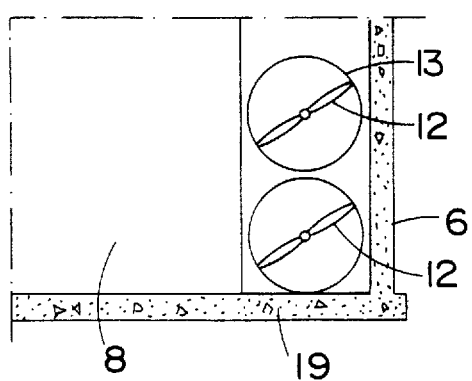
FIG. 3 is a cross sectional view taken on line III—III in FIG. 1.
Figure 4A:
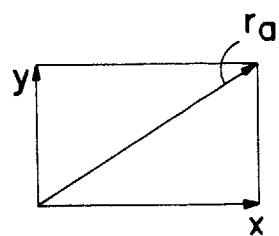
FIG. 4 is a vector diagram showing relative flow rates at different depths of the cross section shown in FIG. 2.
Figure 4B:
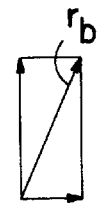
Figure 4C:
Figure 4D:
Figure 4E:
Figure 4F:

Centrally located between the side walls 4 the basin of the embodiment shown in FIG. 1 has a longitudinal inner wall 8 serving to form a circumferential channel 10 in the basin 2. Preferably the inner wall extends along the major part of the basin and terminates at a distance from one end wall 6 thereof, such that the water may pass without excessive pressure drop. At the other end there is a flow generator 16, for reasons to be explained below. The flow generator 16 may, for example, be in the form of one or more propellers 12 mounted in respective openings 13 in inner wall 8 as shown in FIG. 3.

At the bottom of the basin, on either side of the inner wall 8 adjacent thereto and parallel to the longitudinal axis of the basin there is a longitudinal tubular air diffuser 14 of the type described in EP patent No. 0 448 597, i.e. perforated with apertures capable of producing air bubbles in the range of about 0.03 mm to about 1 mm, the larger bubbles acting by physical adsorption to form a contaminated foam on the water surface substantially directly above the air diffusor 14, and the remaining smaller bubbles acting together with particulates acting to form a flotation slurry containing particulate impurities at the water surface 15 in the basin, as described in detail in the above EP patent publication No. 0 448 597.

Upstream of the flow generator 16 and adjacent thereto, such as at the nearest basin corner as shown in FIG. 1, there is a foam and slurry removing means 18 to be explained and described more fully below.

Figure 2:
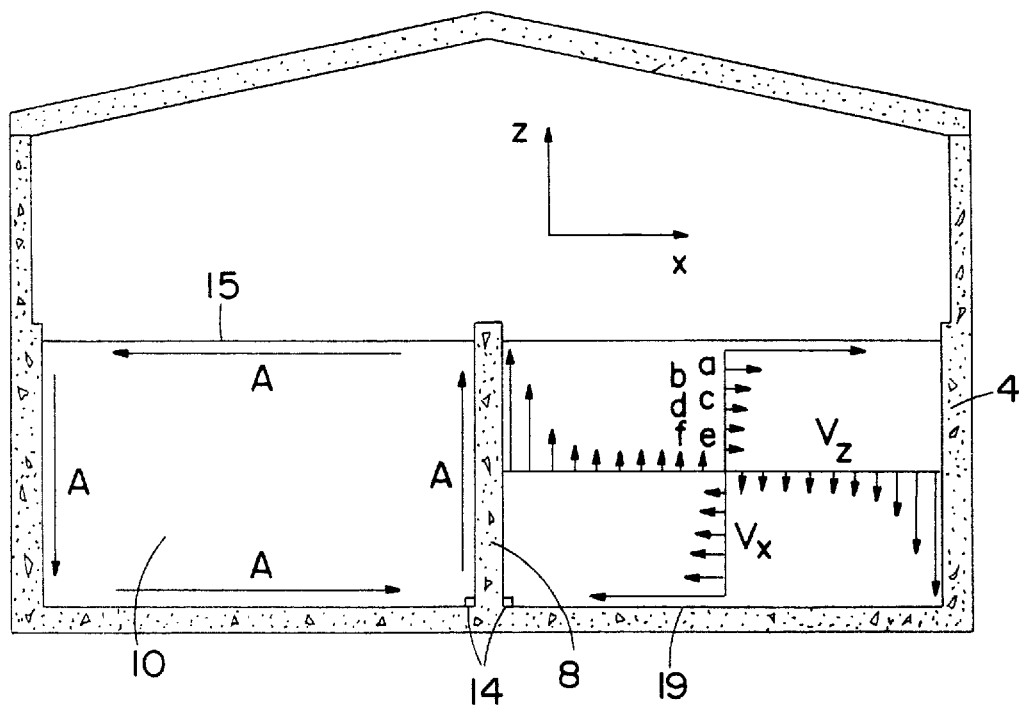
FIG. 2 is an enlarged cross sectional view taken on line II—II in FIG. 1.

As in the plant according to the above EP patent, in operation of the above described plant the air bubbles from the longitudinal diffusors 14 will also act as a flow generator causing a circulation of the basin water laterally of the longitudinal axis of the diffusers 14, i.e. in the lateral direction of the basin. Water is dragged with the rising air bubbles to create a rising flow along the inner wall 8, outwards toward the side walls 4 at the surface 15, down along the side walls and back along the bottom 19 as indicated with arrows A in the left part of the sectional view in FIG. 2. Also, in order to better visualize the flow conditions in the basin caused by the diffusor flow generator 14 the right hand part of FIG. 2 is provided with two vector diagrams, $V_z$ and $V_x$, indicating the relative flow velocities in different water layers in the vertical and lateral directions respectively of the basin. Here as well as in the following description reference is made to an x,y,z coordinate system in which z and x refer to the depth and lateral or cross directions respectively of the basin, and y to the longitudinal direction thereof i.e. normal to the plane of the drawing FIG. 2. As is apparent from the diagrams the is relative flow velocities in the channel 10, both in the z and x directions, decrease from a maximum near the opposite walls 4, 8 and bottom 19—water surface 15 respectively, to about zero along the central axis of channel 10.

At the same time the flow generator 16 in the channel 10 will cause the water in the basin to circulate in the circumferential direction of the basin around the channel 10, as indicated with arrows B in FIG. 1, in which a further vector diagram $V_y$ is drawn, indicating that the flow velocity in the longitudinal direction of the channel caused by the flow generator 16 is substantially constant across the channel cross section, at least in the water layer adjacent surface 15.

Thus, the two above described circulation streams A, B, as caused by the air diffusers 14 and propellers 12 respectively, will create flow components in the x-y directions in different depths (termed "level" a–f in FIG. 2), as indicated in the vector diagrams in FIG. 4 in which also the resultants $r_{a-rf}$ of the respective flow components are indicated.

The polluted foam and slurry which, owing to the diffusor-based flotation and physical adsorption processes, are formed at the surface 15 of the water in the basin 2, will interact and form a stabile mixture termed foamslurry as it follows the surface water streams according to the resultant $r_a$ of the above described lateral and longitudinal flow components x, y respectively. In FIG. 1 this is visualized by indicating the path of a pollution particle entrained with the foamslurry, from the point P at which it appears on the surface above the diffusor 14. As schematically indicated it will float obliquely toward the side wall 4 of the basin in accordance with $r_a$ and then follow a peripheral or circumferential flow path S around the basin. The same will happen with practically any pollution particle in the foamslurry at the surface, all of which relatively rapidly concentrates in the peripheral flow path S along the edge of the basin from which it may easily be removed by means of the foamslurry removal means 18.

Figure 5:
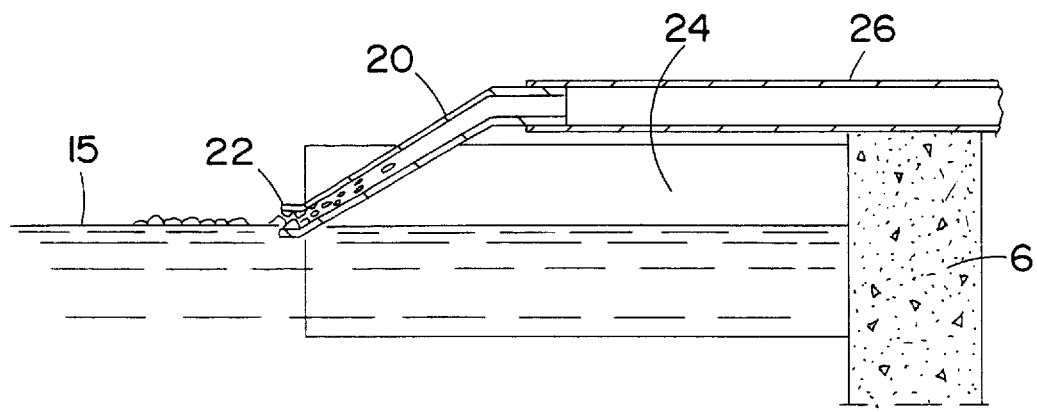
FIG. 5 is a further enlarged cross sectional view taken on line V—V in FIG. 1.

In a preferred embodiment of the plant according to the invention the foamslurry remover 18 comprises a vacuum means, e.g. in the form of a mouth piece 20. As shown in detail in FIG. 5 the suction opening 22 of the mouth piece 20 is located at the level of the water surface 15 and may advantageously be surrounded by a screen or skimmer 24 acting to guide the foamslurry toward the suction opening 22. The mouth piece 20 communicates via a pipeline 26 and a vacuum chamber 28 (FIG. 1) with a vacuum source 30, such as a fan. The vacuum chamber 28 and source 30 may suitably be positioned in an adjacent room 32 near the suction mouth piece. In operation, the foamslurry and a relatively very small fraction of the surface water are drawn through the mouth piece and into the pipeline to disintegrate into a thin sludge that enters the vacuum chamber 28 where it can be transferred to an adjacent dewatering vessel 34 in which the sludge is dewatered by any convenient manner. The water part can be diverted back to the basin 2 as indicated with the arrow C, via a weir 36 schematically indicated in FIG. 1, or it can be diverted to an effluent pipeline.

Any refilling of water into the basin may advantageously take place in the area where the water from the weir 36 enters. This also applies in case the plant is to be used for other purposes than the fattening of fish or the like, such as for treating waste water, sewage or other polluted water, in which case treated water would be tapped off centrally in the water column in the area between the mouth piece 20 and flow generator 16, in an amount equalling that of the inflowing polluted water. If, in addition to the flotation and physical adoption processes, it is desireable or necessary to have the basin water filtered through a biofilter, such as of the type noted in NO patent No. 172 487, this may advantageously take place in a conventional manner by permitting the basin water to flow through an external circulation circuit (not shown) in which the biofilter is incorporated.

While the rectangular longitudinal shape of the water basin with the water treatment device according to the invention as shown in FIG. 1 has been found to be the most convenient one, particularly in connection with use as a fish fattening plant, it is within the scope of the invention to give the basin any other shape that would be convenient for the intended use, such as circular or oval.

Figure 6:
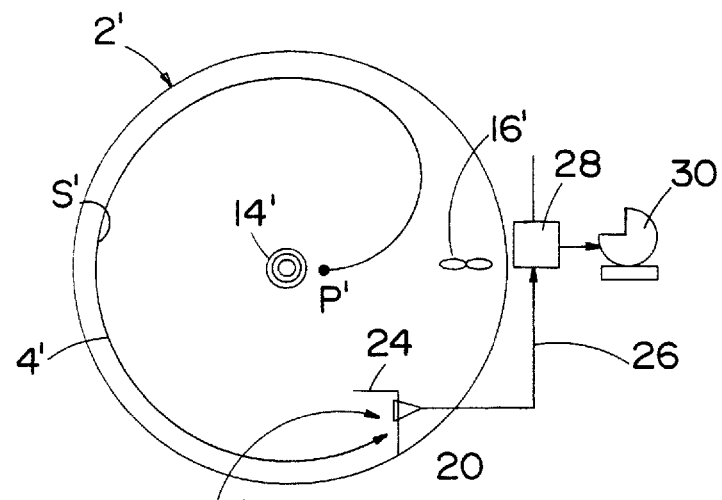
FIG. 6 is a plan view of an other embodiment of a basin with the device according to the invention.

An example of a such circular basin 2' is shown in FIG. 6. Here the diffusor means 14' is arranged without any inner wall centrally at the bottom of the basin. The flow generator 16', in the form of a propeller or similar devise, is disposed near the basin peripheral wall 4, and the foamslurry removal means 18' is positioned relatively close to the flow generator upstream thereof. Otherwise the suction system 20, 24, 26, 28, 30 etc. is the same as in the previous example. Here, the diffusor 14' will cause a radially outwardly directed flow component at the water surface, with the result that a polluted particle would float from a point P' in the area above the diffusor curvingly toward the basin peripheral wall 4' and thence follow a peripheral flow path S' around the basin 2' until it is drawn into the foamslurry removal means 18'.

I claim:

1. A water treatment method comprising:
   introducing water to be treated into a basin having a closed bottom and an outer wall;
   aerating said water by means of stationary diffusor means located at said bottom spaced from said outer wall to produce air bubbles of varying size acting to lift water impurities toward the surface of said water and to positively circulate said water in said basin as a first stream flowing vertically upwardly from said diffusor means, horizontally toward said basin outer wall, vertically downwardly at said outer wall and horizontally along said bottom of said basin back toward said diffusor means, said water impurities forming a polluted foam and slurry in a layer on top of said surface of said water;

causing said water to circulate as a second stream circumferentially in said basin, said first and second circulating streams cooperating to concentrate said foam and slurry layer formed on said surface in an outer peripheral flow path; and removing said foam and slurry layer from said basin at at least one position along said peripheral flow path.

2. A method according to claim 1, comprising removing said foam and slurry layer from said peripheral flow path by suction.

3. A method according to claim 1, wherein said foam and slurry layer are disintegrated upon transport in a pipeline forming a thin sludge which in turn is dewatered, and returning the resultant water to said basin via a weir from an adjacent dewatering vessel.

4. Water treatment apparatus comprising:

a basin having a closed bottom and an outer wall for containing water to be treated;

stationary diffusor means located at said bottom of said basin and spaced from said outer wall for producing air bubbles of varying sizes acting to bring water impurities toward the surface of the water and to positively circulate the water in said basin as a first stream flowing in a direction vertically upwardly from said diffusor means, horizontally away from said diffusor means toward said outer wall, vertically downwardly at said outer wall and horizontally along said bottom of the basin back toward said diffusor means;

a flow generator located in said basin and operable to circulate the water therein as a second stream circumferentially in said basin;

said first and second circulation streams cooperating to form an outer peripheral flow path in which foam and slurry on the surface of the water concentrate; and means for removing the foam and slurry and located at at least one position along said peripheral flow path.

5. An apparatus according to claim 4, wherein said basin is of rectangular shape including side walls and end walls, and further comprising an inner wall centrally between said side walls and forming a circumferential channel in said basin, said flow generator being located in an opening between said inner wall and one side end wall, and said diffusor means being located along said inner wall.

6. An apparatus according to claim 4, wherein said outer wall of said basin comprises a circular peripheral wall, said diffusor means is located centrally at said bottom of the basin, and said flow generator is located at said peripheral wall.

7. An apparatus according to claim 4, wherein said removing comprises a suction device communicating with a vacuum source.

8. An apparatus according to claim 7, wherein said suction device is surrounded by a skimmer adapted to guide the foam and slurry toward said suction device.

* * * * *